United States Patent [19]

Stil

[11] Patent Number: 4,800,642

[45] Date of Patent: Jan. 31, 1989

[54] METHOD OF PRODUCING A HYDROPNEUMATIC ACCUMULATOR

[75] Inventor: André Stil, Vimont Par Argences, France

[73] Assignees: Automobiles Peugeot, Paris; Automobiles Citroen, Neuilly Sur Seine, both of France

[21] Appl. No.: 80,028

[22] Filed: Jul. 30, 1987

[30] Foreign Application Priority Data

Aug. 4, 1986 [FR] France ................................ 86 11482

[51] Int. Cl.[4] ................................................ B23P 11/00

[52] U.S. Cl. .................................... 29/436; 29/157 R; 228/173.1; 228/184

[58] Field of Search .................... 29/157 R; 228/173.1, 228/184; 138/30

[56] References Cited

U.S. PATENT DOCUMENTS

| | | | |
|---|---|---|---|
| 3,397,719 | 8/1968 | Ortheil | 138/30 |
| 3,461,530 | 8/1969 | Cadiou | 138/30 X |
| 4,427,028 | 1/1984 | Jacobellis | 138/30 |
| 4,506,431 | 3/1985 | Mercier | 228/184 X |

FOREIGN PATENT DOCUMENTS

| | | | |
|---|---|---|---|
| 693342 | 8/1965 | Italy | 220/67 |

*Primary Examiner*—Timothy V. Eley
*Assistant Examiner*—Frances Chin
*Attorney, Agent, or Firm*—Herbert Dubno

[57] ABSTRACT

A method for manufacturing a hydropneumatic accumulator including a metal sheet casing and an elastomer membrane which separates the inside of the casing into a first chamber containing a pressurized gas and a second chamber containing a liquid, this membrane being fixed to the casing by a cup, in which method a sheet metal disk is cold deformed in two operations, namely a first operation for obtaining a cylindrical or conical blank, one end of which has a convex bottom and provided with an orifice for filling the first chamber with gas, and a second operation in which, after the membrane has been fixed in the casing by means of the cup, the cylindrical part of the blank is hammered so as to give it a spherical shape with an axial orifice in which a connection is crimped and welded for feeding liquid into the second chamber, wherein said cup is fixed to the bottom of the casing by irremovable means and the first deformation operation is carried out so that the blank has a form such that the membrane may be engaged between it and the cup, clamping of the membrane between the cup and the casing being obtained during the second spherical hammering operation.

6 Claims, 1 Drawing Sheet

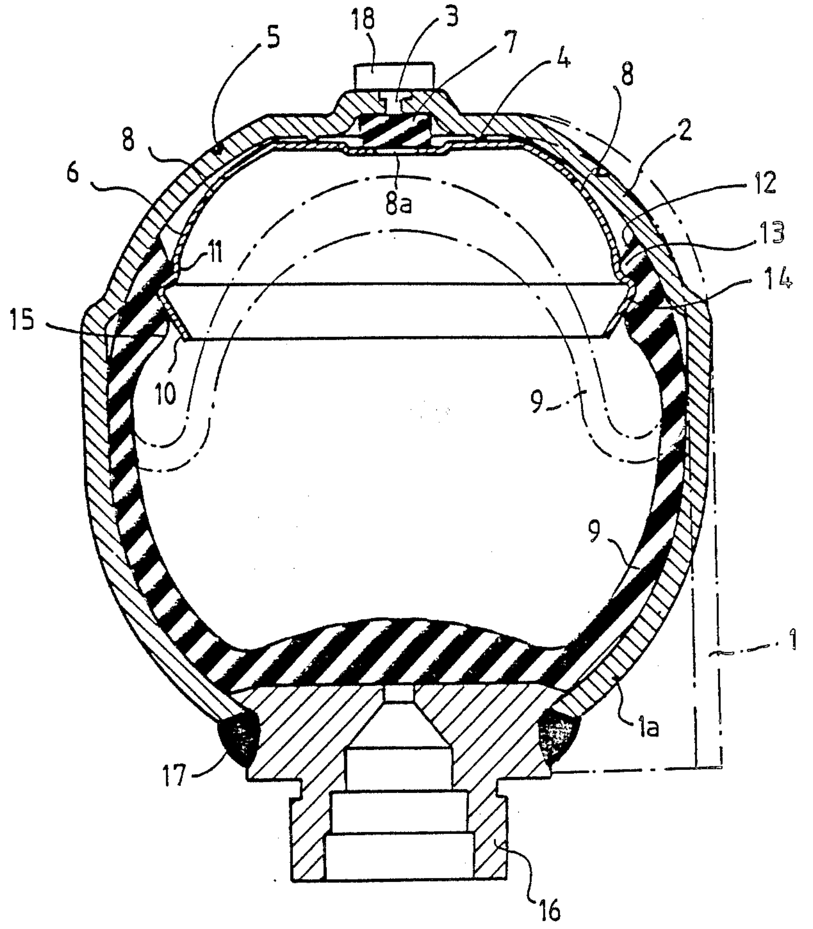
18
3
7
4
5
8
2
8
6
12
11
13
14
15
8a
10
9
9
1
1a
17
16

METHOD OF PRODUCING A HYDROPNEUMATIC ACCUMULATOR

FIELD OF THE INVENTION

The present invention relates to a hydropneumatic accumulator including a sheet-metal casing and an elastomer membrane which separates the inside of the casing into a first chamber containing a pressurized gas and a second chamber containing a liquid, this membrane being fixed to the casing by a cup.

BACKGROUND OF THE INVENTION

Accumulators of the aforedescribed type are manufactured by cold deformation of a metal disk in two operations, namely a first operation for obtaining a cylindrical or conical blank whose end has a convex bottom and is provided with an orifice for filling the first chamber with gas and a second operation in which, after the membrane has been fixed in the casing by means of the cup, the cylindrical part of the blank is hammered to give it a spherical shape having an axial orifice in which a connection is crimped and welded for feeding liquid into the second chamber.

Up to now, the cup is fixed to the casing by means of a bolt and nut for, after inflation of the accumulator, tightening the head of the screw against a seal.

OBJECT OF THE INVENTION

The object of the present invention is to improve the manufacture of these accumulators for simplifying assembly and reducing the risk of leaks.

OBJECT OF THE INVENTION

The method of the invention is characterized in that the cup is fixed to the bottom of the casing by irremovable means and the first deformation operation is carried out so that the blank has a form such that the membrane may be engaged between it and the cup, clamping of the membrane against the cup and the casing being obtained during the second spherical hammering operation.

The cup may for example be fixed by welding to internal bosses at the bottom of the casing.

The present invention also provides a hydropneumatic accumulator obtained by the above method and in which the cup is fixed at the bottom of the casing by irremovable means.

The cup may have a conical edge which cooperates with a conical edge of the membrane during assembly of this latter.

An elastomer material valve may be inserted between the bottom of the casing and the cup, in line with the gas filling orifice, the cup having an opening allowing the gas contained in the chamber to apply this valve against the orifice.

BRIEF DESCRIPTION OF THE DRAWING

By way of non limitative example, one embodiment of a hydropneumatic accumulator according to the invention will be described hereafter, with reference to the sole FIGURE of the accompanying drawings which is an axial sectional view of this accumulator.

SPECIFIC DESCRIPTION OF THE PREFERRED EMBODIMENT

To manufacture a hydropneumatic accumulator according to the invention, a metal disk is deformed so as to obtain a cylindrical or conical blank 1, one end of which has a convex bottom 2; the central part of this bottom is flat and has a central filling orifice 3 as well as three internal bosses 4 at 120° from each other. At the connection between the central part and the convex part, the blank has at least two external diametrically opposite imprints 5.

Then a securing cup 6 is welded to the bottom 4 with insertion of a rubber valve 7 between this cup and the convex bottom 2, in line with the central orifice 3. This cup has at mid-height a number of evenly spaced holes 8, for example eight in number, two of them being interposed facing the imprints 5, and a central hole 8*a*.

Then, on cup 6, the peripheral edge of a membrane 9 is clipped for separating the gas chamber from the liquid chamber in the accumulator. For this, cup 6 has a conical edge 10 above which an annular groove 11 is provided. The end edge or lip 12 of membrane 9 is conical and this membrane has, after this edge, successively a bead 13, an annular groove 14 and a bear 15. The edge of membrane 9 is engaged between blank 1 and cup 6, which is facilitated by the conical edges 10 of the cup and 12 of the membrane, until the bead 13 of the membrane is engaged in the groove 11 of the cup, the edge 10 of this latter being applied between the groove 14 and the bead 15 of the membrane.

Finally, the end of blank 1 is hammered so as to give it a spherical shape 1a which defines an axial orifice to small diameter; in this orifice is crimped a connection fitting 16 and it is welded as shown at 17. During this hammering operation, membrane 9 is clamped between cup 6 and the casing formed by the hammered blank 1, as can be seen in FIG. 1 in which the shape of the blank before hammering has been shown at the right with a dash-dot line and that of the casing after hammering of the blank with a continuous line.

It only remains to inflate the accumulator by introducing therein a pressurized gas, for example nitrogen, through the filling orifice 3. Under the effect of the pressure of the filling orifice 3. Under the effect of the pressure of this gas, membrane 9, which had the shape shown with the dash-dot line, is deformed and assumes a spherical shape, as shown with continuous lines, while being applied against the wall of the casing, the central part of this membrane being applied against connection 16. When the desired pressure in the accumulator is reached, when the pressurized filling gas is cut off, valve 7 is applied against orifice 3 preventing the gas introduced from leaving. It only remains to weld a plug 18 inside orifice 3 to provide final sealing and reinforce the spherical skull-cap.

The arrangement of imprints 5 and holes 8 means that the imprints form intentionally weakened zones at which an erupture of the casing will preferentially occur. Where the holes in the cup are aligned with the locations of rupture, the gas can readily vent past the cup and the membrane can come to lie against the cup when the gas pressure is relieved so that neither the cup nor the membrane material need be explosively ejected to the exterior.

It goes without saying that the present invention should not be considered as limited to the embodiment described and shown, but covers on the contrary all variants thereof.

What is claimed is:

1. A method of manufacturing a hydropneumatic accumulator, comprising the steps of:

(a) cold forming a sheet metal disk into a blank having a wall surrounding an axis, open at one axial end and formed with an outwardly convex bottom at an opposite axial end, said outwardly convex bottom being formed with an orifice and with internal bosses spaced around said orifice;

(b) fixing in said blank against said bottom a cup opening in the direction of said one axial end and having a lip and at least one hole, said cup being welded to said bosses;

(c) disposing, between said lip and said wall within said blank, a membrane defining with said bottom a first chamber adapted to be filled with a gas supplied to said first chamber through said orifice;

(d) thereafter hammering said wall in the region of said one axial end to impart a generally spherical shape thereto and to crimp a liquid fitting to said wall and define between said liquid fitting and said membrane a second chamber to which liquid can be fed through said fitting, and welding said wall to said fitting; and (e) hammering said wall in the region of said bottom inwardly to impart a generally spherical shape thereto and clamp said membrane against said lip of said cup.

2. The method defined in claim 1 wherein said cup is formed with a conical edge constituting said lip and engageable with said membrane.

3. The method defined in claim 1, further comprising the step of inserting between the bottom of said casing and said cup in line with said orifice, a valve composed of elastomer material and enabling the gas to fill said first chamber.

4. The method defined in claim 1, further comprising the step of welding a plug to said bottom to close said orifice.

5. The method defined in claim 1, further comprising the step of forming on an external surface of said blank at least two diametrically opposite imprints in the region of said bottom.

6. The method defined in claim 1 wherein said cup is formed with a plurality of holes including respective holes facing regions of said bottom provided with said imprint.

* * * * *